(12) United States Patent
Eichhorn

(10) Patent No.: US 8,175,125 B2
(45) Date of Patent: May 8, 2012

(54) LASER DEVICE

(75) Inventor: Marc Eichhorn, Weil Am-Rhein (DE)

(73) Assignee: Institut Franco-Allemand de Recherches de Saint-Louis, Saint-Louis (FR)

( * ) Notice: Subject to any disclaimer, the term of this patent is extended or adjusted under 35 U.S.C. 154(b) by 0 days.

(21) Appl. No.: 12/320,569

(22) Filed: Jan. 29, 2009

(65) Prior Publication Data

US 2009/0190616 A1 Jul. 30, 2009

(30) Foreign Application Priority Data

Jan. 29, 2008 (DE) .......................... 10 2008 006 661

(51) Int. Cl.
*H01S 3/11* (2006.01)

(52) U.S. Cl. ................ 372/10; 372/12; 372/26; 372/71; 372/97; 372/99

(58) Field of Classification Search ............. 372/10, 372/12, 97, 26, 71, 99
See application file for complete search history.

(56) References Cited

U.S. PATENT DOCUMENTS

| | | | | |
|---|---|---|---|---|
| 5,195,104 A | * | 3/1993 | Geiger et al. | 372/97 |
| 5,197,074 A | * | 3/1993 | Emmons et al. | 372/26 |
| 7,391,794 B2 | * | 6/2008 | Kane | 372/10 |
| 7,586,957 B2 | * | 9/2009 | Sierra et al. | 372/12 |
| 2002/0125227 A1 | * | 9/2002 | Sun et al. | 219/121.61 |
| 2007/0258493 A1 | * | 11/2007 | Kennedy | 372/10 |

FOREIGN PATENT DOCUMENTS

DE 41 02 409 A1 8/1992

* cited by examiner

*Primary Examiner* — Jessica Stultz
*Assistant Examiner* — Yuanda Zhang
(74) *Attorney, Agent, or Firm* — Oliff & Berridge, PLC

(57) ABSTRACT

A laser device includes an outcoupling mirror, a laser medium, a phase-conjugate mirror based on stimulated Brillouin scattering, and an end mirror all arranged along an optical axis of the laser device. A controllable modulator is positioned between the phase-conjugate mirror and the end mirror. The outcoupling mirror and the end mirror form a start cavity. The outcoupling mirror and the phase-conjugate mirror form a main cavity.

15 Claims, 3 Drawing Sheets

LASER DEVICE

BACKGROUND OF THE INVENTION

1. Field of Invention

The disclosure relates to a laser device for the production of high-energy laser pulses.

2. Description of Related Art

A laser device is known from DE 41 02 409 C2 and includes the following elements, arranged one after another along the optical axis:
- a outcoupling mirror,
- a laser medium,
- a phase-conjugate mirror (PCM) based on stimulated Brillouin scattering (SBS),
- an end mirror.

The outcoupling mirror and the end mirror form a start cavity, whereas the outcoupling mirror and the phase-conjugate mirror form a main cavity. With a phase-conjugate mirror, good beam quality is attained in mirror operation or operation of the main cavity. The individual light waves are precisely reflected back upon themselves and optical aberrations in the laser medium are not compounded, but almost compensated by reverse propagation of the light waves in the laser medium. The effect of a time-variable thermal lens occurs in the laser medium. That is, the laser medium functions as a time-variable thermal lens. However, this is balanced out by the phase-conjugate mirror, so that each laser pulse has good beam quality from the beginning.

In the laser device of DE 41 02 409 C2, a neutral density filter is positioned between the phase-conjugate mirror and the end mirror. The neutral density filter, which has a transmission of 20% in this example, reduces the Q-factor of the start cavity. The production of a single laser pulse of high energy occurs as described below. First the laser medium is pumped. To do so, a flash lamp is used for pumping. A laser beam builds up in the start cavity. The phase-conjugate mirror is still transparent, as the Brillouin threshold has not yet been reached. The pumping of the laser medium continues, increasing the strength of the laser beam within the start cavity. When, as a result of the pumping, high energy has been stored in the laser medium and the laser beam is further amplified, the Brillouin threshold is exceeded and the phase-conjugate mirror ignites. In a very brief period of time, in the nanosecond range, the phase-conjugate mirror changes from its initial very high transparency to mirror function. This starts the main cavity operation and the start cavity is decoupled. Since, following the ignition of the phase-conjugate mirror, the degree of reflection increases on a nanosecond time scale, the quality of the main cavity also increases in the same short period of time. This means that the phase-conjugate mirror also acts as a Q-switch in the main cavity. The high energy stored in the laser medium is converted in the main cavity into a laser pulse of high power and part of the laser pulse is emitted through the outcoupling mirror. The level of absorption of the neutral density filter is thus adjusted to the given pump energy, so that only a strong pulse is generated towards the end of the pumping process. For example, when pumping with a high power and long duration, a neutral density filter with a higher absorption is selected. This reduces the Q-factor of the start cavity, causing the phase-conjugate mirror only to ignite later, as required, at the end of the pumping process, in order to allow a single pulse to be generated.

A disadvantage of the laser device of DE 41 02 409 C2 is that, despite the generation of a pulse, which is stable in time, the delay period is difficult to predict. This is because the delay period, that is the time span between the beginning of the pumping process and the emission of the pulse, depends on many external parameters, such as, for example, the amount of the pump energy, the variation of pump power vs. time, or the absorption level of the neutral density filter that is used. The ambient conditions also play a role, such as the effect of mechanical vibrations and shocks. Therefore, the timing of the emission of the laser pulse cannot be precisely predicted, even if the beginning of pumping is known.

A further disadvantage is that the use of a neutral density filter of a particular absorption level also determines the energy of the pulse generated. For, as previously described, the pump power and the pumping progress are precisely adjusted to a certain absorption level of the neutral density filter, such that the laser pulse forms at the end of pumping.

SUMMARY

One object is to design a laser device such that the generation time of a laser pulse of variable and adjustable energy can be pre-set with high precision.

Advantages of the disclosed laser device are that a laser pulse of predefined energy and pre-determined timing can be generated. According to some embodiments, the laser device includes the following elements arranged one after another along the optical axis: an outcoupling mirror, a laser medium, a phase-conjugate mirror based on stimulated Brillouin scattering (SBS) and an end mirror. The outcoupling mirror and the end mirror form a start cavity, whereas the outcoupling mirror and the phase-conjugate mirror form a main cavity.

The positioning of a controllable modulator between the phase-conjugate mirror and the end mirror causes the start cavity to be released (opened) at the required moment in time. On the one hand this allows the laser medium to be pumped to the highest possible level in order to generate a laser pulse of maximum energy. On the other hand it is possible to pump the laser medium less intensely in order to generate a laser pulse of lower power. With the opening of the start cavity, the main cavity can take up its brief operation after the ignition of the phase-conjugate mirror. Since the delay interval between the release of the start cavity and the laser pulse emission is extremely short and can be calculated for any external parameter, the timing of the laser pulse emission by the switchable modulator can be precisely determined.

After the ignition of the phase-conjugate mirror, the start cavity is decoupled. Decoupling protects the modulator from most of the laser pulse energy. This allows a number of controllable modulators to be used.

One procedure for operating the laser device includes the following steps:

Pumping the laser medium with a pre-set pump power, whereby the modulator blocks the start cavity. Blocking the start cavity ensures that the main cavity cannot start oscillating.

Stopping the pump operation and switching the modulator to unblock the start cavity. A laser pulse builds up in the start cavity. The phase-conjugate mirror (PCM) ignites and changes from a high beam transparency to a mirror function. The laser pulse continues to build up in the main cavity and part of the laser pulse is emitted through the outcoupling mirror.

According to an embodiment, the controllable modulator and the phase-conjugate mirror are designed and operate together such that the ratio of the laser energy of the laser radiation passing through the modulator to the total laser energy of the laser radiation which propagates between the laser medium and the phase-conjugate mirror is smaller than 0.2. Controllable modulators can be easily damaged by high energy laser radiation passing through them. Controlling the ratio as described above protects the often sensitive, controllable modulator as the laser pulse energy affecting the modulator is limited.

According to another embodiment, the modulator is designed in such a way and is switchable via a computer unit, so that it immediately blocks the start cavity once the phase-conjugate mirror has switched from transparent operation to mirror operation. In mirror operation, current phase-conjugate mirrors attain a reflectivity of 90%. This means that, in mirror operation, 10% residual energy is emitted from the phase-conjugate mirror in the direction of the modulator and the end mirror. Due to the fact that the controllable modulator blocks the start cavity, no perturbing reflections of the residual intensity transmitted by the phase-conjugate mirror can occur after blocking. The before-mentioned perturbing reflections would also have a negative influence on the build-up of the laser pulse in the main cavity. The design increases the beam quality of the emitted laser pulse. However, a controllable modulator that reacts in the nanosecond range is preferred. Therefore, according to an embodiment based on this, the modulator is designed as an electro-optical Q-switch.

According to another embodiment, the energy of a laser pulse exceeds 50 mJ. The energy produced by this embodiment allows for defense applications, since it can be used to destroy enemy optronic devices.

According to another embodiment, the laser medium is a crystal that is doped with thulium, holmium or erbium. Using such a crystal, a laser device can be constructed allowing a compact design for high laser energy and emitting wavelengths greater than 1.4 μm.

According to another embodiment, the laser medium features Brewster end faces. This eliminates the need for a polarizer in the beam path of the laser device as well as anti-reflection coatings of the laser material. The latter increases the damage threshold of the surface of the laser medium.

According to another embodiment, the laser device includes a seed laser, with which a seed laser signal can be injected into the start cavity and/or the main cavity. This facilitates the build-up of the laser pulse in the initial start-cavity operation. The laser pulse is stabilized in the subsequent main-cavity operation. The seed laser increases the beam quality and allows for higher laser pulse energies.

BRIEF DESCRIPTION OF THE DRAWINGS

The above-mentioned embodiments, objects, features, advantages, technical and industrial significance of this invention will be better understood by reading the following detailed description of exemplary embodiments, when considered in connection with the accompanying drawings in which.

DETAILED DESCRIPTION

Figure 1:
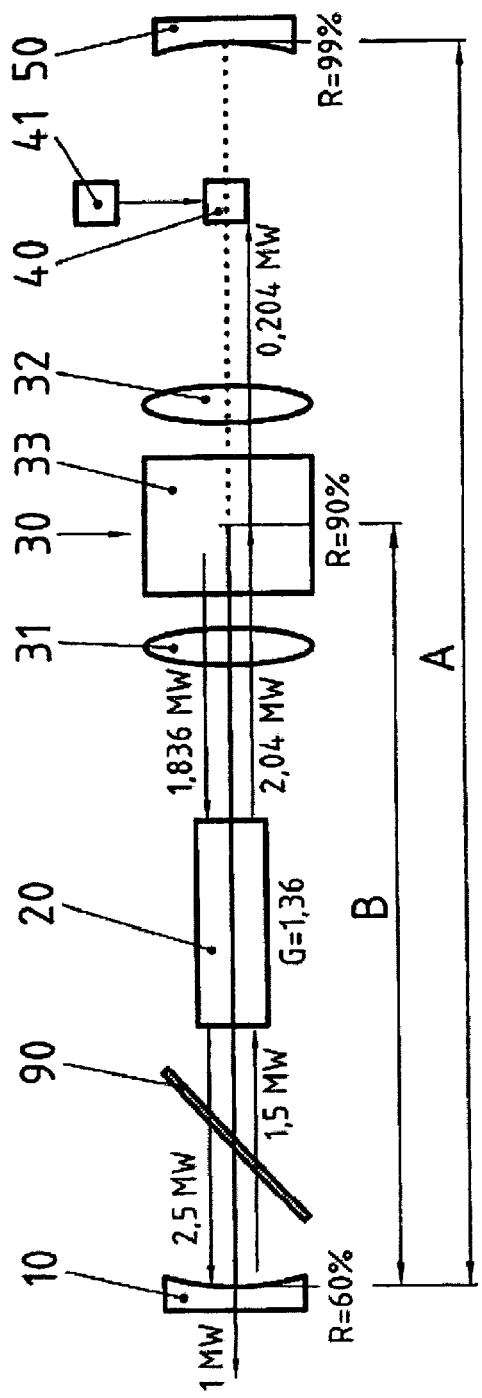
FIG. 1 is a view schematically showing a laser device with specifications.

FIG. 1 shows a laser device that includes the following elements, arranged one after another along the optical axis:
  outcoupling mirror 10,
  a laser medium 20,
  a phase-conjugate mirror (PCM) 30 based on stimulated Brillouin scattering (SBS),
  a controllable modulator 40,
  an end mirror 50.

The outcoupling mirror 10 and the end mirror 50 form a start cavity A, whereas the outcoupling mirror 10 and the phase-conjugate mirror 30 form a main cavity B.

FIG. 1 shows that a polarizer 90 is positioned between the outcoupling mirror 10 and the laser medium 20. In the present laser device embodiment, the polarizer causes a linearly polarized output radiation of the laser, preferred for certain applications such as, for example, the operation of a non-linear optical element.

Figure 3:
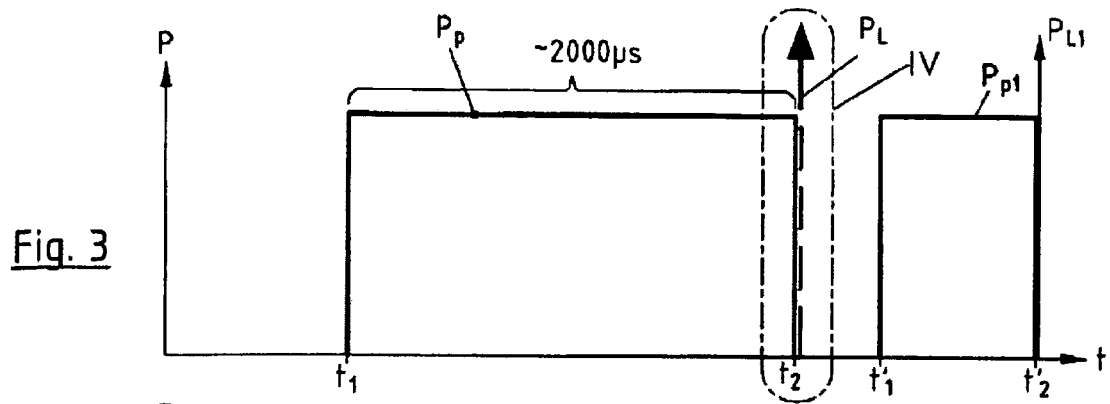
FIG. 3 is a graph showing the pump power and the laser pulse power over time, where the time is in micro-seconds and the pumping and pulse power is in watts.
Figure 4:
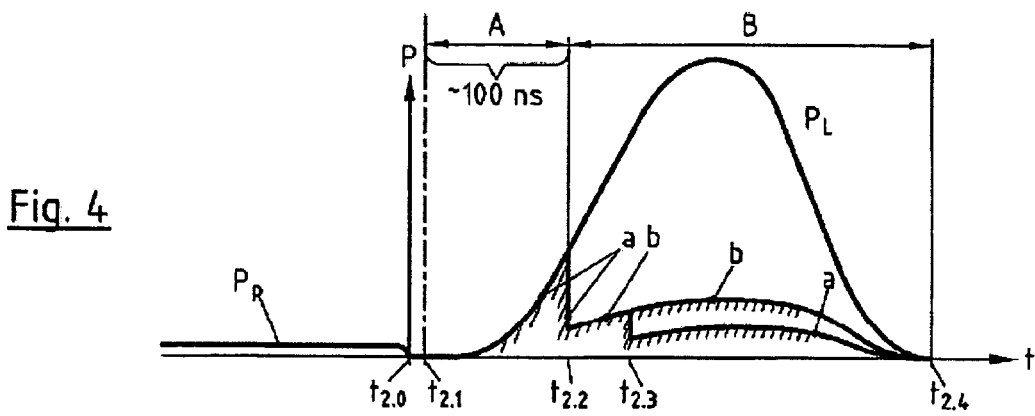
FIG. 4 is a graph showing a Detail IV of the graph of FIG. 3 in order to illustrate the build-up of the laser pulse within the main cavity (the scale of the time axis is in nanoseconds and the scale of the pulse power is in megawatts)

FIG. 3 illustrates the pumping of the laser. The scale of the time axis is therefore in the micro-second range and the scale of the power is in the watt range. FIG. 4, on the other hand, illustrates the evolution of the short-term laser pulse. The scale of the time axis is correspondingly in the nanosecond range and the scale of the power is in the mega-watt range.

Figure 3A:
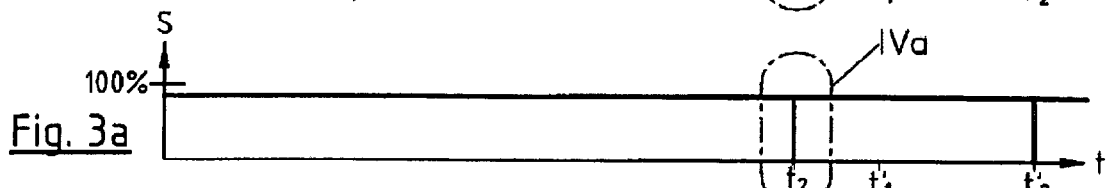
FIG. 3*a* is a graph showing a modulator switchable within nanoseconds, in which the extinction factor of the modulator is given over time, whereby the time axis shows the same scale as in FIG. 3.
Figure 3B:
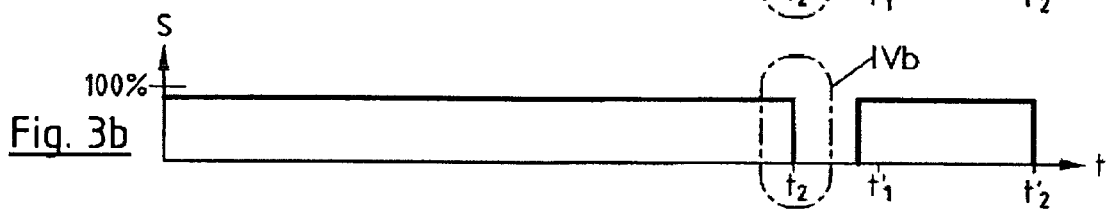
FIG. 3*b* is a graph showing a modulator not switchable within nanoseconds, in which the time axis shows the same scale as in FIG. 3.
Figure 4A:
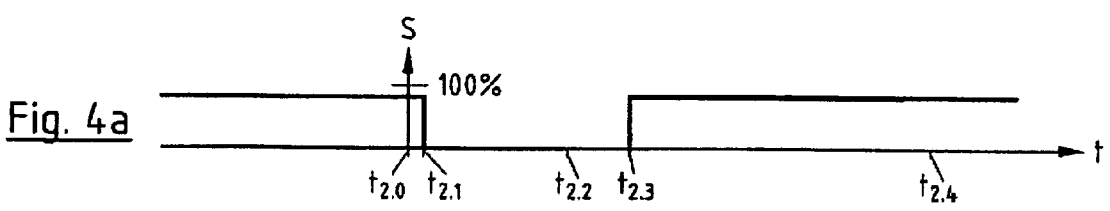
FIG. 4*a* is a graph showing a Detail IVa of graph of FIG. 3*a* for a modulator switchable within nanoseconds.
Figure 4B:
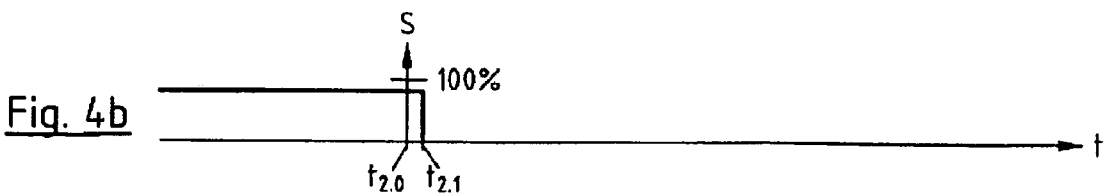
FIG. 4*b* is a graph showing a Detail IVb of the graph of FIG. 3*b* for a modulator not switchable within nanoseconds.

The method for operating the laser device of FIG. 1 includes the following steps:
  a) First the laser medium is pumped with a pre-set pump power. This is shown in FIG. 3. Pumping takes place in a time interval between $t_1$ and $t_2$. Before and during pumping, the modulator 40 blocks the start cavity A. This can be seen in FIG. 3*a* and FIG. 3*b*. In the time interval mentioned, the extinction factor shown is almost 100%.
  b) Then pumping operation is stopped and the modulator 40 is switched to unblock the start cavity A. In FIG. 4, with the large scale for power and very small scale for time, the end of pump operation at the point in time of $t_o$ is only indicated, because, due to the large scale for power, pump power Pp is hardly visible. In FIG. 4*a*, the case of the use of a fast switchable modulator, the change from a high to a very low extinction factor is marked a few nanoseconds after $t_{2.0}$ at time point $t_{2.1}$. This unblocks the start cavity A. The same applies to the use of a modulator that does not switch as fast as the one depicted in FIG. 4*a*, as shown in FIG. 4*b*.
  c) A laser beam builds up in the start cavity. The phase-conjugate mirror (PCM) 30 ignites and changes from high transparency to its mirror function. Ignition of the PCM 30 occurs at time point $t_{2.2}$. This means that operation of the start cavity A takes place from $t_{2.1}$ to $t_{2.2}$.
  c1) When using a modulator switchable within nanoseconds, it is preferable to include the step of:
    switching the Q modulator 40 to block the start cavity A.

For this, the modulator 40 is designed to be switchable via a computer unit 41 such that it immediately blocks the start cavity after the phase-conjugate mirror 30 has switched from outlet operation to mirror operation. An electro-optical Q-switch is suitable as a modulator. This alternative is illustrated in FIG. 3*a* and FIG. 4*a*. Due to the large time scale, in FIG. 3*a*, a vertical line at the approximate time point of $t_2$ indicates when the modulator blocks the start cavity, whereas the greatly stretched time axis of FIG. 4*a* shows the precise time point $t_{2.3}$.

c2) In the other case of a modulator which is not switchable within nanoseconds, the modulator remains open. This alternative is illustrated in FIG. 3*b* and FIG. 4*b*, as already described in the brief description of the figures.

d) The laser pulse continues to build up in the main cavity B and part of the laser pulse is emitted through the outcoupling mirror 10.

The laser device uses a feature of the phase-conjugate mirror based on simulated Brillouin scattering 30 of building-up a high reflectivity after ignition or activation. This protects the controllable modulator from being damaged by high intensities.

FIG. 4 illustrates the fact that the delay time between the unblocking of the start cavity at the time point $t_{2.1}$ and laser pulse emission is extremely small and therefore negligible. Therefore, by using the switchable modulator, the timing of the laser pulse emission can be precisely given in the 100 ns range.

The laser device shown in FIG. 1 is designed to emit about ten laser pulses in short succession and in FIG. 3, as an illustration, a second laser pulse is shown in the time interval between $t_1'$ and $t_2'$. At time point $t_1'$, that is, the beginning of the second pumping, the modulator switchable within nanoseconds as in FIG. 3*a* is closed, as is the slow switchable modulator as in FIG. 3*b*.

Using the example of the second laser pulse $PL_1$ in FIG. 3, the fact is illustrated that the laser medium is less strongly pumped and that this generates a laser pulse $P_{L1}$ of lower power. As can be seen from FIG. 3 with the larger time scale, at the end of the pump process the modulator unblocks the start cavity at time point $t_2'$, whereupon the emission of the second laser pulse $P_{L1}$ follows immediately.

The controllable modulator 40 and the phase-conjugate mirror 30 are designed and operate together such that the ratio of the laser energy of the laser radiation passing through the modulator 40 to the total laser energy of the laser radiation which propagates between the laser medium 20 and the phase-conjugate mirror 30 is smaller than 0.2. With reference to FIG. 4, this means on the one hand that the area below the curve PL between $t_{2.1}$ and $t_{2.4}$ represents the total laser energy of the laser radiation. On the other hand this means that a maximum of 20% of this energy, which corresponds to 20% of the aforementioned area, passed through the modulator as laser radiation. This applies to all switchable modulators.

The output curve of the laser radiation passing through the modulator 40 of FIG. 1 is shown in FIG. 4. In FIG. 4*a*, the curve for a modulator 40 switchable within nanoseconds is shown, whereas FIG. 4*b* applies to a slow switchable modulator 40. Between $t_{2.1}$ and $t_{2.2}$, that is in start cavity A operation, the modulator 40 is charged with the full initial pulse power. From point $t_{2.2}$, that is, in main cavity B operation, the modulator 40 can only be charged with the residual power which passes through the phase-conjugate mirror 30 in mirror operation. As mirror reflection is about 90%, a maximum of 10% is able to reach the modulator 40 on the PCM 30 side after time point $t_{2.2}$. Over the further course of time, the alternative of the fast switchable modulator 40 proves favorable. Blocking at time point $t_{2.3}$ has the effect that the aforementioned 10% are no longer reflected back by mirror 50 due to blocking. This thereby halves the total energy propagating through the modulator 40. This serves to further protect the often sensitive modulator. The laser energy of the laser radiation, which passes through a fast switchable modulator as in FIG. 4*a*, is the area under curve "a" in FIG. 4. For a slowly switchable modulator as in FIG. 4*b*, the area under curve "b" applies.

Figure 2A:
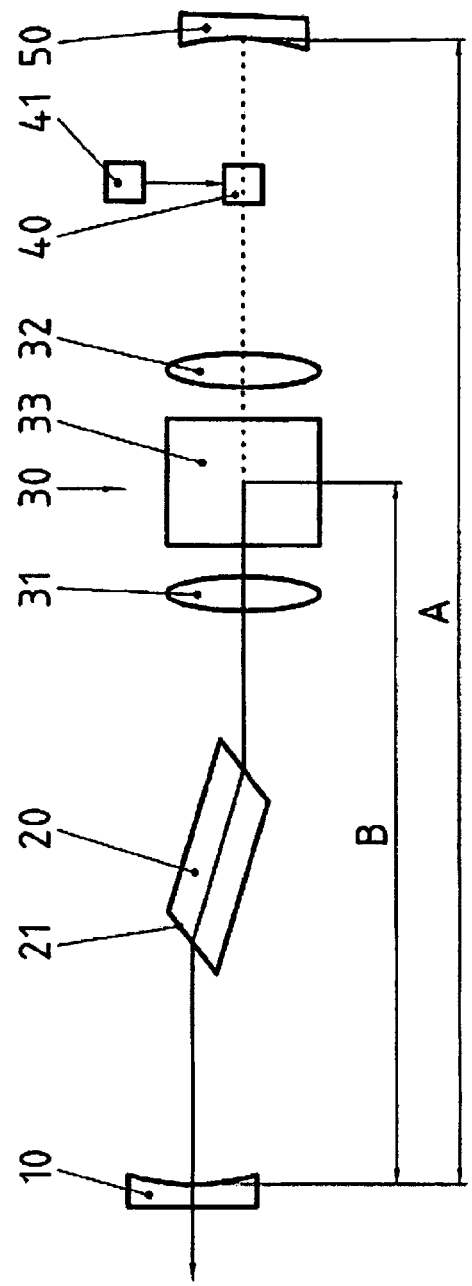
FIG. 2*a* is a view schematically showing a first alternative laser device.

FIG. 2*a* shows yet another embodiment of the laser device. In contrast with the example of FIG. 1, the laser medium 20 has Brewster end faces 21. This eliminates the need for optical coatings on the laser medium 20. This also increases the damage threshold of the laser medium 20. The Brewster end faces 21 are already polarization-selective.

Figure 2B:
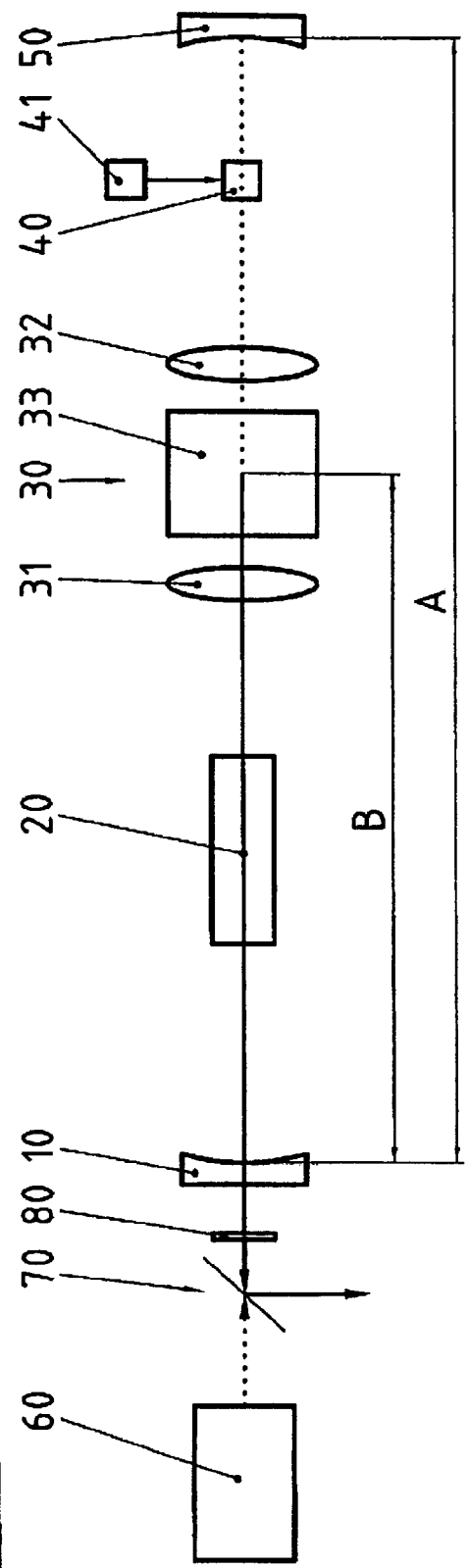
FIG. 2*b* is a view schematically showing a second alternative laser device.

FIG. 2*b* depicts a second alternative laser device embodiment, having a seed laser 60. The seed laser 60 generates a low-energy seed signal with very good beam quality. The seed laser 60 injects the seed signal via the outcoupling mirror 10 into the start cavity A or the main cavity B. The seed laser generates a photon field with an optimum beam quality right from the start of the unblocking of the start cavity A. This facilitates the building up of a laser pulse in the fundamental mode. Furthermore, the seed signal is also present after the ignition of the PCM 30 and stabilizes the fundamental mode operation in the main cavity B. The laser device featuring a seed laser 60 is suitable for laser pulse energies in the range of 100 mJ to over 1 J.

The seed signal can be continuous or pulsed. In the case of a pulsed seed laser signal, the duration of this is somewhat longer than that of the high-energy laser pulse. In addition, the seed laser 60 and the controllable modulator 40 are synchronized with each other. This means that the seed laser signal is already available shortly before the triggering of the modulator 40 and is maintained throughout the duration of the high-energy laser pulse. The longitudinal mode spectrum and the transversal beam profile or the fundamental mode of the seed laser are adjusted to the start cavity A and the main cavity B in order to attain maximum coupling efficiency and consistency with the simulated Brillouin scattering (SBS) process.

Since the SBS in phase conjugation, as in a passive mirror, changes the polarization of circular-polarized light by a pi, $\pi$, phase shift, the signal emitted by the outcoupling mirror 10 is easily separated from the seed signal by a combination of polarizer 70 and a quarter-wave plate 80.

The laser medium 20 is a crystal which can be doped with thulium, holnium or erbium. In the present example, the laser medium is a Ho:YAG with an emission cross-section of $1.2 \times 10^{-20}$ cm$^2$. The saturation fluence is thus 8 J/cm$^2$. As an alternative, the laser medium can be a Tm:YAG. Here the emission cross-section is $1.5 \times 10^{-21}$ cm$^2$ with a saturation fluence of 43 J/cm$^2$. The laser pulses generated have a wavelength of 2.09 μm for Ho:YAG and 2.02 μm for Tm:YAG. This corresponds to the short-wave infra-red range. For example, IR seeker head detectors, sensitive in the aforementioned wavelength ranges, can be damaged with such a laser device. In order to destroy IR seeker head detectors that are sensitive in the long-wave range, additional conversion elements on the basis of a non-linear optical device have to be used. The conversion elements convert the laser pulse generated with a short wavelength into a laser pulse with the required longer wavelength.

In FIG. 1 the specifications of the laser are presented. The power of a single laser pulse is 1 MW. This is the result of the energy of a laser pulse of 100 mJ for a duration of the laser pulse of 100 ns.

The phase conjugate mirror 30 is a unit and includes the lenses 31 and 32 and a container filled with a pressurized Brillouin medium 33. Lenses 31 and 32 generate an intra-cavity focus. The Brillouin medium 33 is the gas $SF_6$, which is under a pressure of 20 bar. The SBS threshold is 174 kW. SBS amplification is $1.8 \times 10^{-2}$ cm/MW. The SBS line shift is approximately 240 MHz. The laser pulse makes approximately 25 revolutions in the main cavity B. In doing so it undergoes a frequency shift of 25×0.24 GHz (6 GHz). For a wavelength of 2.09 µm this corresponds to 0.1 nm. As this is still within the amplification range of the laser medium, the PCM 30 efficiency is not affected by this.

Once the PCM 30 reaches its threshold, its reflectivity quickly increases and attains a level of about 90%. For the PCM 30 reflectivity of 90%, an intensity of about tenfold the threshold level falling onto the PCM 30 is preferred. From the power distribution in main cavity B with a PCM reflectivity of 90%, an amplification of the laser medium of G=1.36 is induced by self-consistency.

The outcoupling of the switchable modulator after the ignition of the PCM allows the usage of any type of switchable modulator. In particular, modulators which by nature have a low optical destruction threshold are suitable.

With regard to modulators which can be switched within nanoseconds, an electro-optical modulator (EOM) is suitable. Its switching performance has already been described with reference to FIG. 3a and FIG. 4a. The EOM consists of rubidium-titanyl-phosphate (RTP). This material is well-suited for wavelengths in the 2 µm range. The EOM has high modulation depths of more than 99%. In addition, switching the EOM uses practically no power. The EOM has a very low destruction threshold. The decoupling of the start cavity, however, protects the EOM. The material, RTP, can display scattering losses caused in manufacture. In the present laser device, these losses are negligible as they only occur in the start cavity.

With regard to the modulators which cannot be switched within nanoseconds, an acousto-optical modulator (AOM) is preferred. Its switching performance is shown and has been described with reference to FIG. 3b and FIG. 4b. The material used for the AOM is $SiO_2$. The thermal problems which hereby occur have no influence on the beam quality, as the modulator is not positioned in the main cavity during the laser pulse. For high extinction factors, very high acoustic powers are required, which may amount to 100 W and more, which causes a transient, thermal, non-equilibrium aberration in the modulator material analogous to thermal lenses. As an alternative, the AOM may be made of $TeO_2$. Due to the decoupling of the start cavity, this material is suitable despite its low destruction threshold. $TeO_2$ has a high diffraction efficiency of over 85% with low power in the region of 20 W.

The above described embodiments are examples and various modifications can be made without departing from the spirit and scope of the invention.

What is claimed is:

1. A laser device comprising:
   an outcoupling mirror, a laser medium, a phase-conjugate mirror based on stimulated Brillouin scattering, and an end mirror, arranged along an optical axis of the laser device; and
   a controllable modulator positioned between the phase-conjugate mirror and the end mirror, wherein
   the outcoupling mirror and the end minor form a start cavity, the outcoupling mirror and the phase-conjugate mirror form a main cavity, and the controllable modulator is switchable via a computer unit, such that the controllable modulator immediately blocks the start cavity once the phase-conjugate mirror switches from transparent operation to mirror operation.

2. The laser device according to claim 1, wherein the controllable modulator and the phase-conjugate mirror are operated such that a ratio of a laser radiation passing through the modulator to a total laser energy of the laser radiation which propagates between the laser medium and the phase-conjugate mirror is smaller than 0.2.

3. The laser device according to claim 1, wherein the controllable modulator is an electro-optical Q-switch.

4. The laser device according to claim 1, wherein an energy of a laser pulse generated by the laser device is greater than 50 mJ.

5. The laser device according to claim 1, wherein the laser medium is a crystal that is doped with at least one of thulium, holmium and erbium.

6. The laser device according to claim 1, wherein the laser medium further comprises Brewster end faces.

7. The laser device according to claim 1, further comprising a seed laser that injects a seed laser signal into at least one of the start cavity and the main cavity.

8. The laser device according to claim 1, wherein the controllable modulator is an electronically controllable modulator.

9. The laser device according to claim 1, wherein the controllable modulator is an externally controllable modulator.

10. The laser device according to claim 1, wherein the controllable modulator is controllable on a short time scale below 100 µs.

11. The laser device according to claim 1, wherein the controllable modulator reacts in a nanosecond range.

12. A method of operating a laser device that includes:
   an outcoupling mirror, a laser medium, a phase-conjugate mirror based on stimulated Brillouin scattering, and an end mirror, arranged along an optical axis of the laser device; and
   a controllable modulator that is controllable while installed and is positioned between the phase-conjugate mirror and the end mirror, wherein
   the outcoupling mirror and the end mirror form a start cavity, and
   the outcoupling mirror and the phase-conjugate mirror form a main cavity, the method comprising:
      pumping the laser medium with a pre-set pump power;
      blocking the start cavity by switching the controllable modulator;
      stopping the pumping of the laser medium and switching the controllable modulator to unblock the start cavity;
      building a laser pulse in the start cavity;
      igniting and changing the phase-conjugate mirror from a high transparency function to a mirror function;
      building the laser pulse in the main cavity while part of the laser pulse is emitted from the outcoupling mirror; and
      switching the controllable modulator to block the start cavity prior to the step of building the laser pulse in the main cavity while part of the laser pulse is emitted from the outcoupling mirror.

13. The laser device according to claim 12, wherein the controllable modulator is an electronically controllable modulator.

14. The laser device according to claim 12, wherein the controllable modulator is an externally controllable modulator.

15. The laser device according to claim 12, wherein the controllable modulator is controllable on a short time scale below 100 µs.

* * * * *